(12) United States Patent
Peres et al.

(10) Patent No.: US 8,062,556 B2
(45) Date of Patent: Nov. 22, 2011

(54) NANOCOMPOSITE MATERIAL FOR THE ANODE OF A LITHIUM CELL

(75) Inventors: Jean-Paul Peres, Eysines (FR);
Stephane Gillot, Ambares (FR); Juliette Saint, Amiens (FR); Mathieu Morcrette, Amiens (FR); Dominique Larcher, Amiens (FR); Jean-Marie Tarascon, Mennecy (FR); Pere Roca I Cabarrocas, Villebon sur Yvette (FR)

(73) Assignee: SAFT, Bagnolet (FR)

( * ) Notice: Subject to any disclaimer, the term of this patent is extended or adjusted under 35 U.S.C. 154(b) by 925 days.

(21) Appl. No.: 11/431,834

(22) Filed: May 11, 2006

(65) Prior Publication Data
US 2006/0275668 A1 Dec. 7, 2006

(30) Foreign Application Priority Data
May 13, 2005 (FR) ..................... 05 04828

(51) Int. Cl.
*H01B 1/04* (2006.01)
(52) U.S. Cl. ........ 252/502; 264/430; 428/447; 428/457; 428/698; 429/231.8; 429/330
(58) Field of Classification Search .................. 252/500, 252/502; 424/61; 428/698, 447, 457; 429/231.8, 429/330; 528/14; 156/89.11; 257/17; 264/430
See application file for complete search history.

(56) References Cited

U.S. PATENT DOCUMENTS

| | | | |
|---|---|---|---|
| 6,599,631 B2 * | 7/2003 | Kambe et al. | 428/447 |
| 6,989,428 B1 * | 1/2006 | Bianconi et al. | 528/14 |
| 7,402,832 B2 * | 7/2008 | Lee | 257/17 |
| 2003/0145934 A1 * | 8/2003 | Tani | 156/89.11 |
| 2005/0220730 A1 * | 10/2005 | Malnou et al. | 424/61 |
| 2005/0255335 A1 * | 11/2005 | Suyama et al. | 428/698 |

FOREIGN PATENT DOCUMENTS

JP 04-145134 * 5/1992

OTHER PUBLICATIONS

Li et al., "A High Capacity Nano-Si Composite Anode Material for Lithium Rechargeable Batteries," Electrochemical and Solid-State Letters, 2 (11), Sep. 1, 1999, pp. 547-549.*
Graetz et al., "Highly reversible Lithium Storage in Nanostructure Silicon," Electrochemical and Solid-State Letters, 6 (9), Jul. 3, 2003, pp. A194-A197.*
Kim et al., "High capacity Si/C nanocomposite anodes for Li-ion batteries", Jul. 15, 2005, J. Powder Sources, 136, p. 145-149.*

(Continued)

*Primary Examiner* — Khanh T Nguyen
(74) *Attorney, Agent, or Firm* — Sughrue Mion, PLLC

(57) ABSTRACT

The subject of the invention is an anode material of the silicon-carbon composite type, for a lithium cell, having a high mass capacity and good cycling stability. This material is obtained by a preparation method comprising the steps consisting of:
  a) providing a silicon powder obtained by the plasma-enhanced chemical vapor deposition (PECVD) technique or by $CO_2$ laser, the size of the silicon particles being less than 100 nm;
  b) mixing the silicon powder with a carbon-containing polymer, and
  c) carrying out the pyrolysis of the mixture.

The invention also proposes a lithium cell containing at least one anode the material of which contains the nanocomposite material produced by this method.

13 Claims, 8 Drawing Sheets

OTHER PUBLICATIONS

Yang J et al.; "Si/C Composites for High Capacity Lithium Storage Materials"; Electrochemical and Solid-State Letters Electrochem Soc USA. vol. 6, No. 8; Aug. 2003; pp. A154-A156.

Database CA [Online] Chemical Abstracts Service, Columbua Ohio; Wang; Bao0Feng et al.; "Si/C Composite Negative Electrode Material for Lithium-Ion Batteries;" XP002373557.

Zhang X-W, et al.; "Electrochemical performance of Lithium Ion Battery, Nano-Silicon-Based, Disordered Carbon Composite Anodes With Different Microstructures;" Journal of Power Sources, Elsevier, Amsterda, NL, vol. 125, No. 2; Jan. 14, 2004; pp. 206-213.

Liu Y, et al.; "Novem Composites Based on ultrafine silicon, Carbonaceous Matrix, and the Introduced Co-Milling Components as Anode Hose Materials for Li-ion Batteries"; Electrochemical and Solid-State Letters Electrochem. Soc USA, vol. 7, No. 12; Dec. 2004; pp. A492-A495.

Netz A., et al.; "Amorphous Silicon Formed in Situ as Negative Electrode Reactant in Lithium Cells;" Solid State Ionics, Diffusion & Reactions Elsevier Netherlands, vol. 175, No. 1-4; Nov. 30, 2004; pp. 215-219.

\* cited by examiner

NANOCOMPOSITE MATERIAL FOR THE ANODE OF A LITHIUM CELL

TECHNICAL FIELD

The subject of the invention is a silicon-carbon nanocomposite material for the anode of a lithium cell. This material has high capacity and cycling stability compared to the anode materials known in the state of the art of lithium cells. Also a subject of the invention is a method for the manufacture of the nanocomposite material and a cell the anode of which contains this nanocomposite material.

STATE OF THE ART

The continuing development of portable electronic applications necessitates the use of cells providing higher and higher energy capacity.

Existing lithium ion cells, comprising a carbon-based anode and a cathode based on doped $LiNiO_2$, $LiCoO_2$, $LiMnO_2$ or doped $LiMn_2O_4$, have limited mass and volume energy. The mass and volume energies of the Li ion cells currently available on the market vary between 160 and 200 Wh/kg and between 430 and 500 Wh/l respectively, depending on the electrode and casing technologies.

In addition, the energy delivered by a lithium cell is limited by the carbon-based anode, which does indeed have a long lifetime, but has a reversible capacity limited to about 300-350 mAh/g (the reversible capacity is defined as being the quantity of electricity generated in the course of discharge by the reversible de-insertion of lithium atoms from the carbon).

To respond to these growing energy needs, research is in progress on novel anode materials exhibiting a capacity greater than that of carbon. Among these are intermetallic compounds, pure silicon and pure tin. These have a high theoretical mass capacity (from 500 to 4000 mAh/g), but poor or even catastrophic cycling performance, in particular because of very large volume variations caused by the lithium insertion/de-insertion cycles in these compounds. As an anode material, silicon has a very high mass capacity, ranging from 2000 to 4000 mAh/g, but does not exhibit good cycling stability. The person skilled in the art is therefore reduced to using either carbon, which has a low mass capacity, or new materials which are insufficiently stable to cycling.

Examination of the prior art indicates that several studies have been directed towards the search for Si—C composites which are stable or pseudo-stable to cycling and exhibit mass capacities of 500 to 900 mAh/g. A composite is defined as a material formed of several constituents, among them a plastic material, to obtain particular mechanical properties.

The document U.S. Pat. No. 5,624,606 describes a method for the formation of a compound of the type $Si_yC_{1-y}$ by chemical vapour phase deposition starting from benzene and a gas containing atoms of silicon $SiCl_4$ or $Si(CH_3)_2Cl_2$.

The document U.S. Pat. No. 5,587,256 describes a method for the formation of a compound of the type $Si_yC_{1-y}O_zH_n$ obtained by pyrolysis of a precursor polymer selected from the compounds of the siloxane family.

The document U.S. Pat. No. 5,698,340 describes a method for the formation of a compound of the type $Si_yC_{1-y}O_z$ obtained by pyrolysis of a mixture of a propyltrimethoxysilane, an epoxy novolac resin and a curing agent (4-aminobenzoic acid or hexamethylenediamine).

The methods described in these last three documents make it possible to obtain a composite with nanometer-sized silicon particles. However, the synthesis of the composite is accompanied by the formation of silicon carbide SiC, harmful to electrochemical performance, and the electrochemical performance of the Si—C composites thus synthesised is insufficient in relation to the capacity objectives sought.

The documents EP-A-0 903 797 and EP-A-1 102 339 describe methods for the preparation of active anode material for lithium cells. These methods comprise the grinding of silicon to obtain micrometric silicon, the mixing of the silicon powder with a carbon compound and pyrolysis of the mixture. The reversible capacity of the composite thus obtained remains markedly lower than 1000 mAh/g and its cycling performance is inadequate.

The document EP-A-1 205 989 describes a method for the preparation of a mixture of carbon and silicon particles obtained by grinding and compaction of carbon and silicon by means of a ball mill. The size of the silicon particles is from 50 nm to 290 nm. Particles of carbon are then deposited onto the mixture by vapour phase chemical deposition. The major drawback of this technique is its complexity. The reversible capacities obtainable are lower than 1000 mAh/g.

The abstract of publication No. 5 of the IMLB Congress, Nara, Japan of June 2004 describes a composite Si—C material comprising particles of silicon the size of which lies between 100 nm and 1 µm. The choice of this size range makes it possible to minimise the volume changes of the silicon particles under cycling conditions. FIG. 1 gives an indication of the mass capacity of this composite material in the course of cycling for about ten cycles. This is lower than 1000 mAh/g.

The abstract of publication No. 78 of the IMLB Congress, Nara, Japan of June 2004 describes a nanocomposite Si—C material prepared using a ball mill. The mass capacity of this material measured during the first cycle is about 1020 mAh/g. It falls rapidly since it is no more than about 680 mAh/g at the second cycle.

The abstract of publication No. 79 of the IMLB Congress, Nara, Japan of June 2004 describes a nanocomposite Si—C material obtained by pyrolysis of a mixture of polyvinyl chloride and a composite powder of graphite and silicon previously ground in a ball mill. The ball mill grinding method does not enable a capacity greater than 1000 mAh/g to be obtained.

The abstract of publication No. 83 of the IMLB Congress, Nara, Japan of June 2004 describes the deposition of carbon on the surface of silicon particles by a method of layer deposition by precipitation from metal vapours or by pyrolysis of a mixture of polyvinyl chloride, graphite and silicon. The reversible capacity obtained is 1000 mAh/g, which is insufficient.

What is therefore required is an anode material of the silicon-carbon composite type for a lithium cell, displaying a reversible mass capacity markedly higher than that of carbon and other alternative anode materials (micrometric Si—C, intermetallic compounds, phosphides) and good cycling stability.

SUMMARY OF INVENTION

For this purpose, the invention proposes an anode material of silicon-carbon composite type, for a lithium cell, obtained by an innovative preparation method. This method makes it possible to manufacture a silicon-carbon composite material containing particles of silicon the size of which is less than 100 nm, which will be designated below by the term nanometric particles.

This manufacturing method comprises steps consisting of:

a) providing a silicon powder obtained by the plasma-enhanced chemical vapour deposition (PECVD) method, or by $CO_2$ laser, the size of the silicon particles being less than 100 nm;

b) mixing the silicon powder with a carbon-containing polymer; and c) carrying out the pyrolysis of the mixture.

The invention also proposes a lithium cell containing at least one anode the active material of which contains an nanocomposite material produced by the method of the invention.

The mass capacities measured during the discharge of such a cell are in generally at least 1200 mAh/g at 25° C. for discharge at a current less than or equal to C, and are stable under conditions where the cell is cycled.

DETAILED DISCLOSURE OF EMBODIMENTS OF THE INVENTION

The method for preparation of the Si—C nanocomposite and the structure of the Si—C nano-composite will now be described in detail.

The method for the preparation of the Si—C nanocomposite comprises:

a) the manufacture of a nanometric silicon powder;

b) the mixing of this powder with a carbon-containing polymer and c) the pyrolysis of the mixture.

In step a), the nanometric silicon powder is manufactured by the plasma-enhanced chemical vapour deposition (PECVD) technique or by $CO_2$ laser. The plasma-enhanced chemical vapour deposition (PECVD) technique consists in the introduction of a silicon-based gas, generally silane ($SiH_4$), into an enclosure under very low pressure, of the order of 1 µbar to 1 mbar, then decomposing this gas. The silicon derived from the decomposition of the gas is deposited in a thin layer on the substrate and a major part of the hydrogen is eliminated. The decomposition of the gas in the plasma is achieved under the action of excitation such as a continuous electric discharge, a radio frequency discharge, a very high frequency discharge, or microwaves. Other modes of excitation can also be envisaged. The silane can also be introduced into the enclosure mixed with at least one other gas selected from hydrogen, helium or argon.

By modification of the synthesis parameters, such as the temperature of the substrate, the geometry of the reactor, the pressure, the excitation power, the deposition rate and the degree of dilution of the silane, this technique makes it possible to obtain silicon particles displaying different states of crystallisation, morphology and size.

Three crystallisation states of nanometric silicon are distinguished:

a totally amorphous state, a polymorphous state wherein particles of crystallised silicon are embedded in a matrix of amorphous silicon, or else wherein particles of amorphous silicon are mixed with crystallised particles. The polymorphous state can be obtained when a controlled annealing of amorphous silicon is carried out, a crystalline state.

Preferably, the silicon obtained is amorphous.

The anode of a lithium ion cell containing amorphous particles of silicon displays better performance than a lithium ion cell anode containing polymorphous or crystallised silicon particles.

The synthesis method of the invention makes it possible to obtain silicon particles of size less than 100 nm. Other methods of synthesis such as mechanical synthesis for example by grinding of silicon in a ball mill, do not make it possible to obtain particles as small as with the method of the invention. Preferably, the size of the silicon particles does not exceed 50 nm. More preferably, the size of the silicon particles does not exceed 30 nm. Still more preferably, the size of the silicon particles does not exceed 5 nm.

Figure 1A:
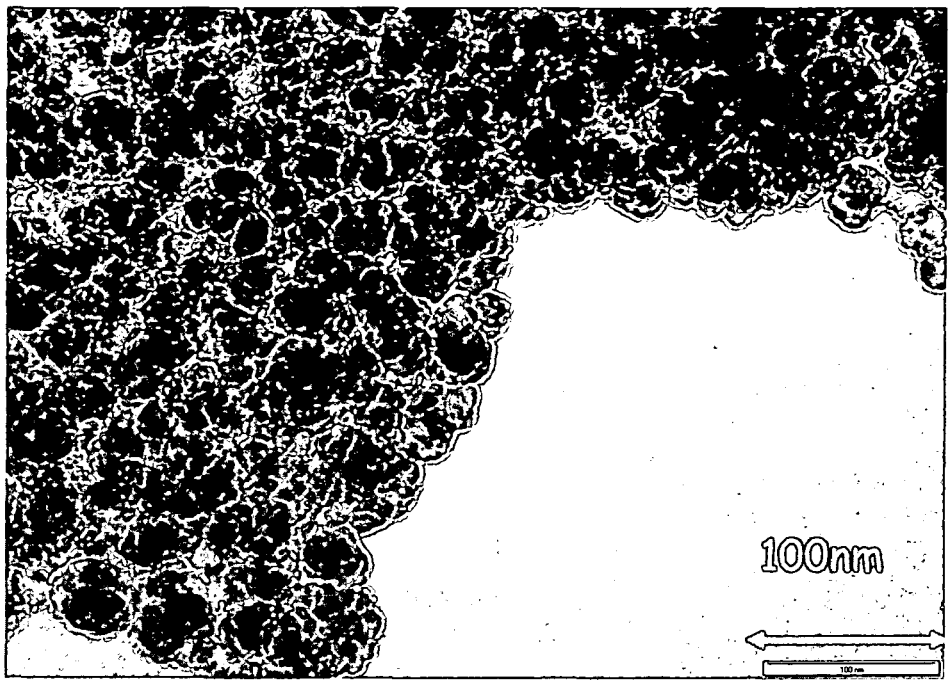
FIGS. 1a, 1b and 1c show high resolution transmission electron micrographs of a nanometric silicon powder obtained by the method of the invention at different magnifications.
Figure 1B:
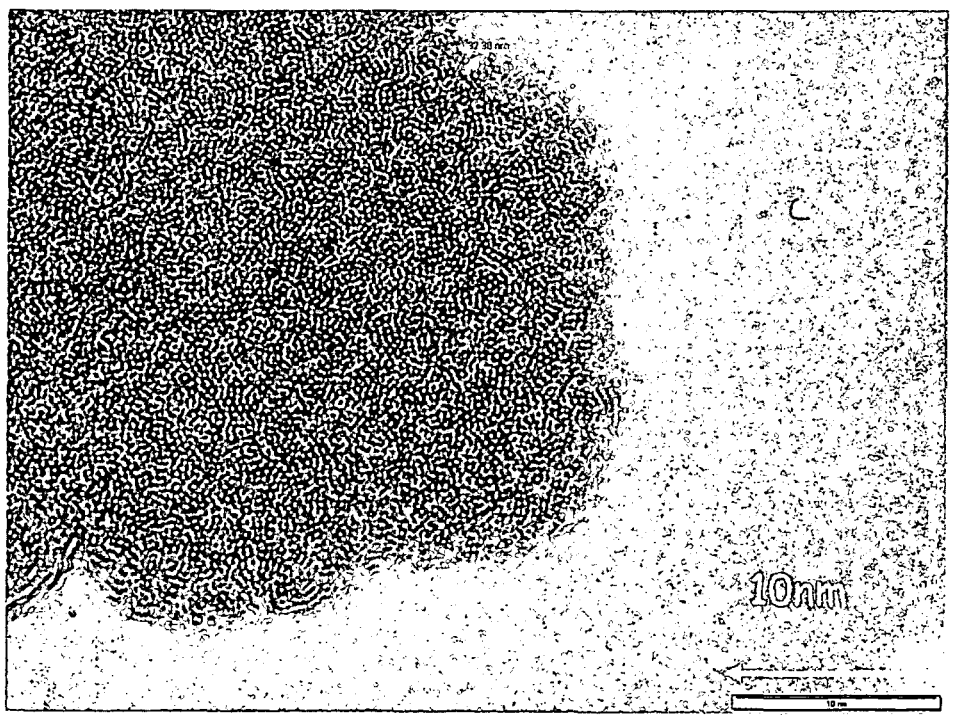
Figure 1C:
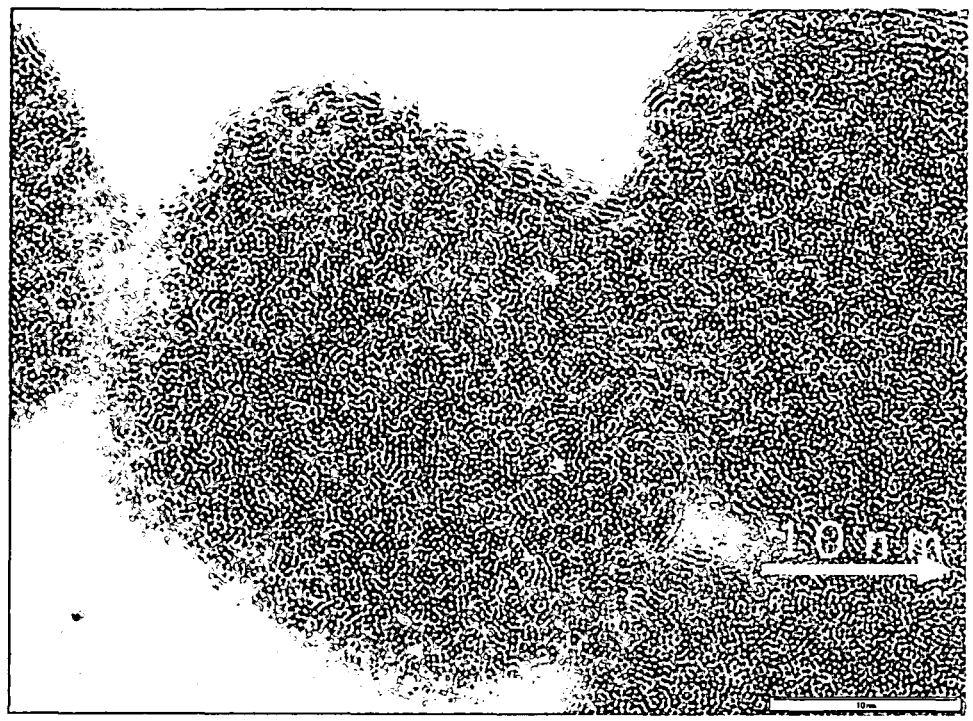

High resolution transmission electron microscopy (HR-TEM) makes it possible to measure the size of the silicon particles. FIGS. 1a, 1b and 1c show transmission electron micrographs of particles of silicon synthesised according to the invention. These figures show that the size of the silicon particles is less than 100 nm.

Figure 1D:
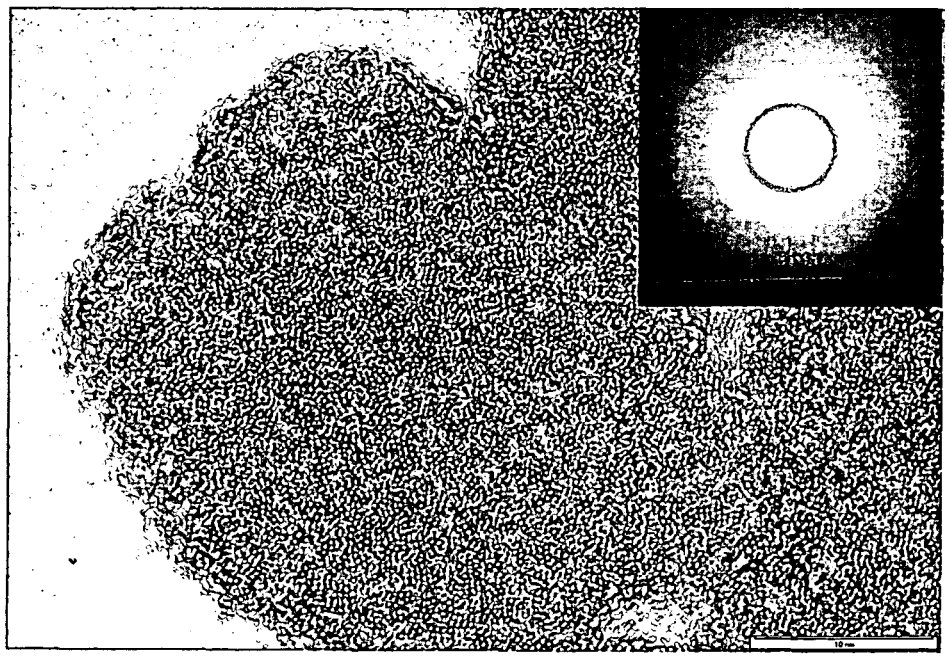
FIGS. 1d, 1e and 1f show high resolution transmission electron micrographs respectively corresponding to samples of nanometric, amorphous, polymorphous and crystalline silicon.
Figure 1E:
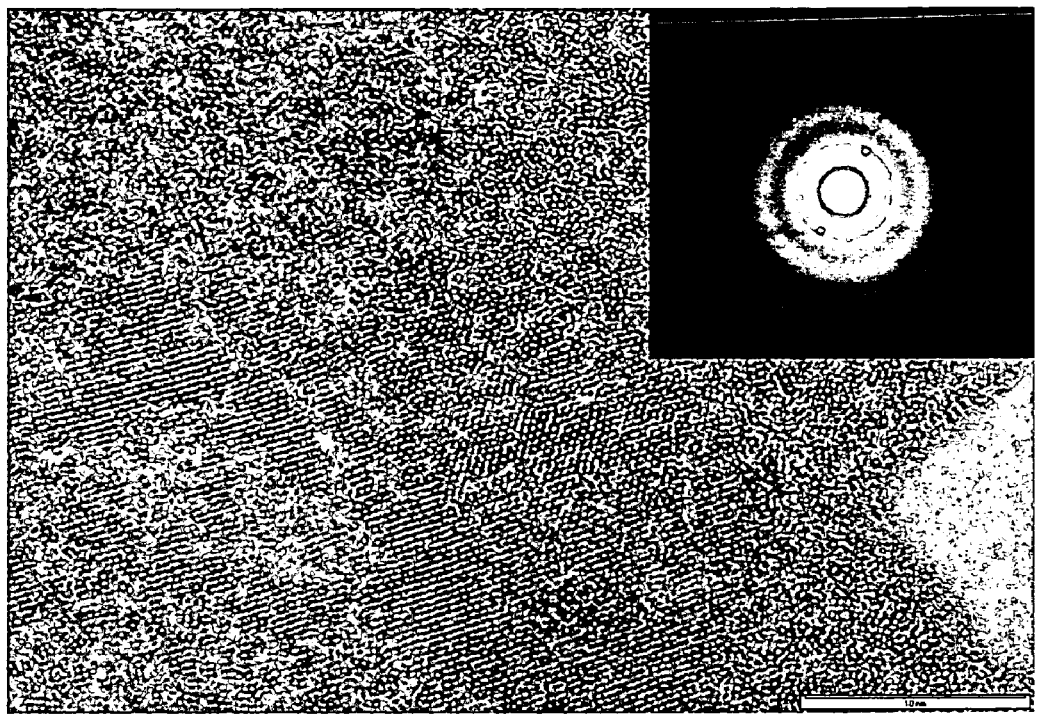
Figure 1F:
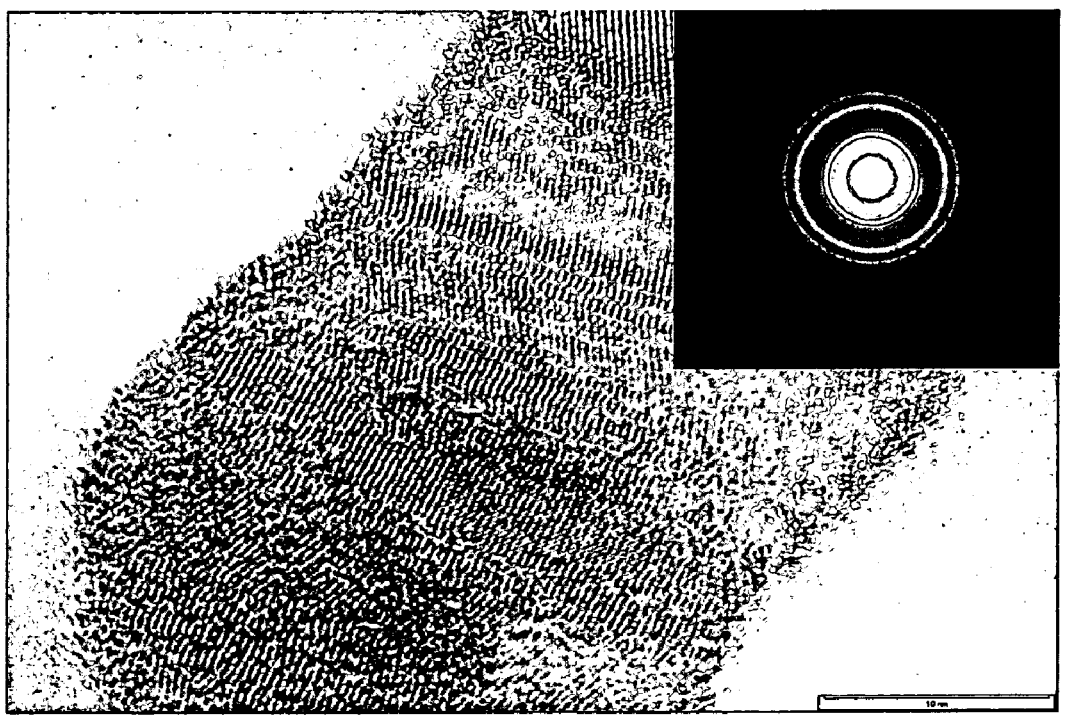

This technique also makes it possible to know the crystallisation state of the nanometric silicon. FIGS. 1d, 1e and 1f show high resolution transmission electron micrographs of samples of amorphous, polymorphous and crystalline silicon respectively.

FIG. 1f, corresponding to crystalline silicon, shows well-defined concentric rings. FIG. 1d, corresponding to amorphous silicon, shows concentric rings of greater diameter, whose boundary is ill-defined.

RAMAN spectroscopy is complementary to transmission electron microscopy since it makes it possible to determine the order of magnitude of the size of the particles of a whole sample of silicon and its crystallisation state, whereas electron microscopy only gives these characteristics for the portion of the sample bombarded by the electrons.

The RAMAN spectrum of silicon contains a band the position and shape of which are functions of the size and the crystalline state of the silicon particles.

Figure 2A:
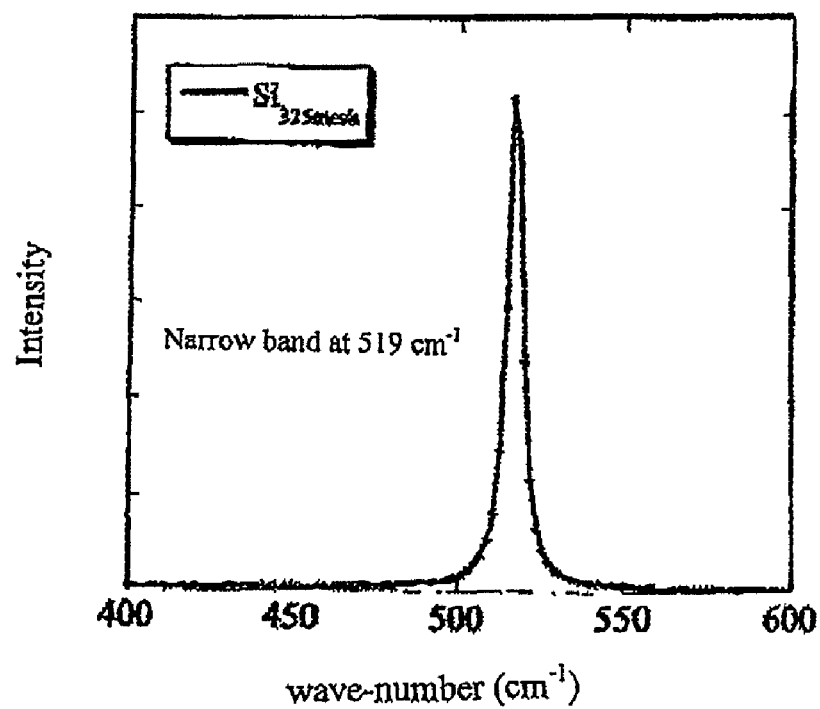
FIG. 2a) shows the RAMAN spectrum of crystallised micrometric silicon.

FIG. 2a shows the RAMAN spectrum of crystalline micrometric silicon. This spectrum displays a narrow band at the frequency of 520 cm$^{-1}$, the half-height width of which is about 7 cm$^{-1}$.

Figure 2B:
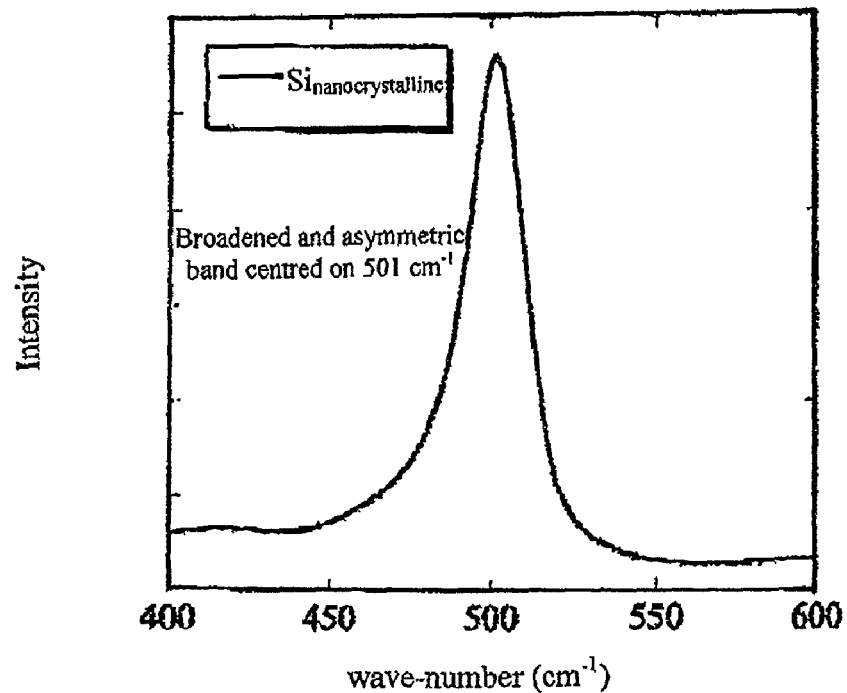
FIG. 2b) shows the RAMAN spectrum of crystallised nanometric silicon.

FIG. 2b shows the RAMAN spectrum of crystalline nanometric silicon. This spectrum displays a band at the frequency of 500 cm$^{-1}$, the half-height width of which is about 22 cm$^{-1}$. The band in the spectrum in FIG. 2a shifts towards a lower frequency and broadens in an asymmetric manner when the size of the silicon particles passes from the micrometer domain to the nanometric domain.

Figure 2C:
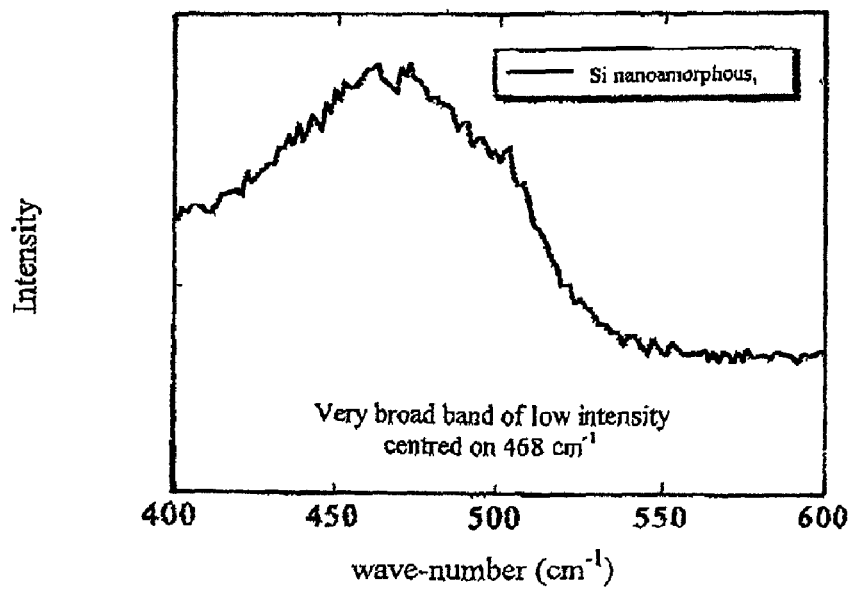
FIG. 2c) shows the RAMAN spectrum of amorphous nanometric silicon.

FIG. 2c shows the RAMAN spectrum of amorphous nanometric silicon. This spectrum displays a band at the frequency of 469 cm$^{-1}$, the half-height width of which is about 100 cm$^{-1}$. The band in the spectrum in FIG. 2b shifts towards a lower frequency and broadens asymmetrically when the crystalline silicon becomes amorphous. Thus RAMAN spectroscopy makes it possible to differentiate crystalline micrometric silicon from amorphous nanometric silicon.

The specific area of the nanometric silicon powder synthesised is from 5 m$^2$/g to 180 m$^2$/g, which is up to 30 times greater than with the micrometric silicon powders. Preferably, the specific area is from 5 m$^2$/g to 80 m$^2$/g.

In step b) of the method, the nanometric silicon powder is mixed with a carbon-containing polymer, and a solvent is optionally added to the mixture in order to dissolve the carbon-containing polymer. The dissolution of the carbon-containing polymer makes it possible to obtain good dispersion of the nanometric silicon particles in the carbon-containing polymer and, after the following step of pyrolysis of the mixture, a good dispersion of the silicon particles in a carbon-containing matrix. The solvent can be selected from the group comprising for example propylene oxide, acetone or a mixture thereof. The mixture thus created is maintained under mechanical stirring at ambient temperature until the evaporation of the solvent.

In a preferred embodiment, the carbon-containing polymer is polyvinyl chloride (PVC), and the organic solvent is propylene oxide.

In another embodiment of the invention, the nanometric silicon powder is mixed with PVC, propylene oxide and up to 20% of graphite. This embodiment enables greater mechanical durability of the composite during the anode manufacturing method and better conductivity.

In another embodiment of the invention, the nanometric silicon powder is mixed with PVC, propylene oxide and carbon fibres.

The quantity of polymer is selected in such a manner that the mass percentage of carbon in the final nanocomposite is from 45 to 75%. Preferably, the mass percentage of carbon in the final nanocomposite is from 50 to 70%. Still more preferably, the mass percentage of carbon in the final nanocomposite is from 50 to 65%. When the mass percentage of carbon in the final nanocomposite is less than 45%, the mechanical performance of the electrode is inadequate. When the mass percentage of carbon in the final nanocomposite is greater than 75%, the mass capacity of the electrode obtained is inadequate.

Figure 1G:
FIG. 1g shows a transmission electron micrograph of an Si—C nanocomposite obtained by the method of the invention.

In step c) of the method, the pyrolysis of the mixture is effected by heating at a temperature comprised between 750° C. and 1000° C. under an inert atmosphere for 1 to 8 hours, advantageously about 4 hours. In the case of a PVC polymer, a pyrolysis temperature of 900° C. will be preferred. The size of the silicon particles embedded in the carbon derived from the pyrolysis of the carbon-containing polymer is not modified in the course of the method, as is shown by FIG. 1g. In fact, the silicon particles retain a size of less than 100 nm.

The pyrolysis temperature range is preferably limited to 1000° C. in order to avoid the formation of silicon carbide SiC, harmful to electrochemical cycling. The presence of silicon carbide is not detected by X-ray diffraction in an Si—C nanocomposite obtained according to the invention at 1000° C. This signifies that, supposing that silicon carbide is present, it is either amorphous, or in a quantity too low to be detected. The presence of silicon carbide was also not detected by RAMAN spectroscopy.

On the other hand, for a pyrolysis temperature of 1150° C., the presence of silicon carbide can be demonstrated by X-ray diffraction and by electron energy loss spectroscopy (EELS).

In the course of the pyrolysis, the silicon contained in the nanocomposite recrystallises. After pyrolysis, the silicon particles which were in an amorphous state develop towards a polymorphous state, and those which were in a polymorphous state develop towards a crystallised state.

Preferably, the recrystallisation of the silicon in the course of the pyrolysis is incomplete and the silicon in the nanocomposite is amorphous. Without wishing to be bound by one theory, the applicant thinks that the first electrochemical insertion of lithium into the crystalline structure of the silicon is accompanied by a change in volume of the crystal lattice. This change is reduced when the silicon is only partially crystallised or preferably when it is amorphous. It will therefore be preferable to obtain a silicon powder and an Si—C nanocomposite in the least advanced crystallisation state, so as to minimise the changes in volume of the silicon on insertion of the lithium into the structure of the silicon.

The stage of mixing of the silicon nanoparticles in a solution of a carbon-containing polymer followed by the pyrolysis of this mixture makes it possible to obtain a good dispersion of the silicon nanoparticles in the carbon-containing mass. Mechanical synthesis does not enable such a good dispersion to be obtained. High resolution scanning electron microscopy makes it possible to assess the quality of the dispersion.

The Si—C nanocomposite thus prepared serves an active anode material for a lithium cell.

The anode contains the Si—C nanocomposite, carbon black and a binder.

The carbon black serves to improve the electrical conduction of the electrode; it represents about 2 to 25% of the weight of the active anode material.

The binder can be soluble in an aqueous medium and contain for example a mixture of carboxymethylcellulose (CMC) polymer and a butadiene-styrene copolymer (SBR), in a total proportion ranging from 2 to 20% by weight of the active anode material. The binder can also be soluble in an organic medium and contain for example polyvinylidene fluoride (PVDF) in a proportion ranging from 2 to 20% by weight of the active anode material.

The active cathodic material can be selected from one or several materials from the following three groups:

the first group comprises $LiNiO_2$, $LiCoO_2$, $LiMnO_2$. Ni, Co and Mn can be replaced by one or by several of the elements selected from the group comprising Mg, Mn (except for $LiMnO_2$), Al, B, Ti, V, Si, Cr, Fe, Cu, Zn and Zr.

the second group comprises mixed oxides of phosphorus, lithium and at least one transition metal of general formula $Li_xM_zPO_4$ where $0<x<3$ and $z=1$ or 2. Examples of such oxides are: $LiMnPO_4$, $LiCoPO_4$, $LiFePO_4$, $LiVPO_4F$ and $Li_3Fe_2PO_4$.

the third group comprises $LiMn_2O_4$, it being possible for the Mn to be replaced by one or more of the elements selected from the group comprising Ni, Co, Mg, Al, B, Ti, V, Si, Cr, Fe, Cu, Zn and Zr.

The second and third groups also contain materials suitable for operation at voltages greater than 4.5 V relative to $Li^+/Li$ such as, for example, those described in the French patent application FR2831993.

The electrolyte used is a standard electrolyte in the art of lithium cells. The solvent is a mixture of organic solvents selected from the linear carbonates, saturated cyclic carbonates, unsaturated cyclic carbonates and linear esters. The solvents can be selected from the group comprising ethylene carbonate (EC), propylene carbonate (PC), dimethyl carbonate (DMC) and vinylidene carbonate (VC).

A lithium salt is dissolved in this mixture of solvents. It can be selected from the group comprising lithium hexafluorophosphate ($LiPF_6$), lithium tetrafluoroborate ($LiBF_4$), lithium hexafluoroarsenate ($LiAsF_6$), lithium perchlorate ($LiClO_4$), lithium bis-oxalatoborate (LiBOB), lithium trifluoromethane sulphonimide $LiN(CF_3SO_3)_2$ (LiTFSI), lithium bisperfluoroethylsulphonylimide (LiBETI) and lithium trifluoromethanesulphonemethide ($LiC(CF_3SO_2)_3$ (LiTFSM).

The concentration of this salt in the mixture of solvents is variable, for example, between 0.5 and 1.5 molar in the solvent, preferably 1 molar. The invention is not restricted to lithium ion cells; it also applies to lithium-polymer cells.

EXAMPLES

Tests were carried out:
1) firstly on a half-cell containing:
   an anode containing an Si—C composite according to the invention
   a counter-electrode and a reference electrode of metallic lithium.
2) secondly on a cell containing:
   an anode containing an Si—C composite according to the invention
   a cathode based on $LiCoO_2$.

1. Tests on a Half-Cell

Nano-amorphous silicon is prepared under the following conditions. A mixture of silane and argon is introduced into the reaction enclosure at a pressure of $6.6\times10^{-4}$ bar. The temperature of the substrate is about 250° C. The power of the radio frequency discharge is about 10 to 20 W. The silicon powder collected on the substrate is then mixed with a quantity of PVC sufficient for obtaining a $Si_{1.6}$—$C_6$ nanocomposite containing 62% by weight of carbon. The mixture is heated to 900° C. The nanocomposite thus obtained is used in the manufacture of an anode. This anode is assembled with a counter-electrode and a metallic lithium reference electrode so as to form a half-cell.

Figure 3:
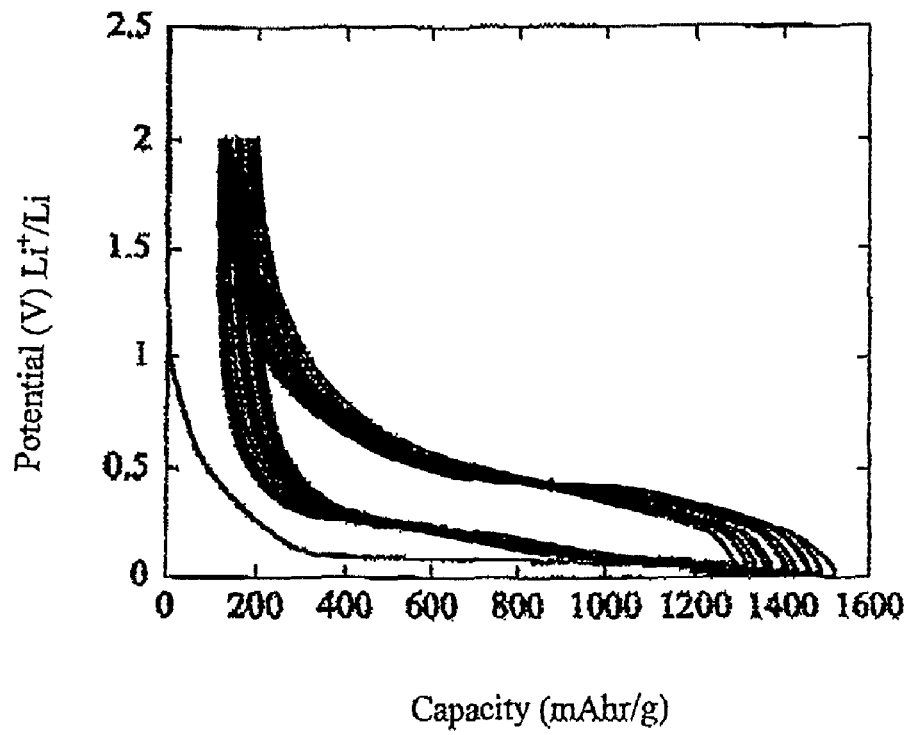
FIG. 3 shows the cycling curves of a half-cell comprising an anode active material made up of an $Si_{1.6}$—$C_6$ nanocomposite according to the invention. The mass percentage of carbon is 62% relative to the weight of the composite. The discharge was carried out at a current of C/20.
Figure 4:
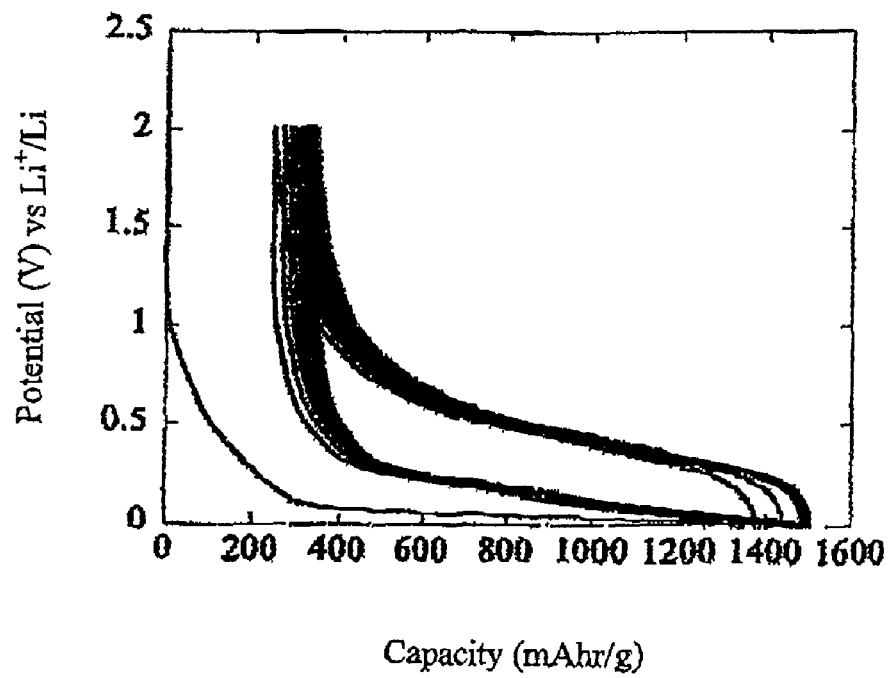
FIG. 4 shows the cycling curves of a half-cell comprising an anode active material made up of an $Si_{1.6}$—$C_6$ nanocomposite according to the invention. The mass percentage of carbon is 62% relative to the weight of the composite. The discharge was carried out at a current of C/10.

The half-cell is tested during charge-discharge cycles at 25° C. The discharge current is C/20 and C/10, C representing the conditions for charging the cell in one hour. FIGS. 3 and 4 show the results of the cycling trials for discharge at the current of C/20 and C/10, respectively. The capacity discharged is measured by means of a coulometer.

FIGS. 3 and 4 indicate that the capacity discharged is comprised between 1200 and 1400 mAh/g.

Figure 5:
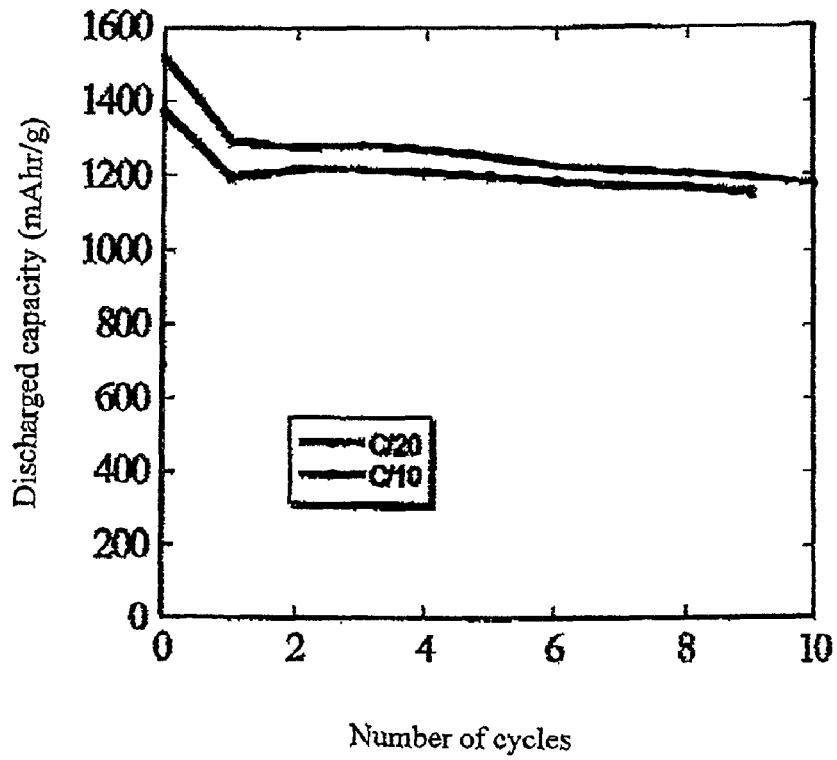
FIG. 5 shows the variation in the capacity of a half-cell in the course of cycling at C/10 and C/20.

FIG. 5 indicates that the capacity of the half-cell in cycling is stable, which proves that the nanocomposite of the invention is mechanically stable. The insertion of the lithium into the silicon particles embedded in the mass of carbon takes place in a reversible manner, with a low change in volume of the $Li_xSi$ alloy. The presence of the carbon matrix around the silicon particles makes it possible to maintain the electrical contact and ensure the cohesion of the material. The duration of cycling corresponding to a 10% loss in capacity is at least a hundred cycles. The mechanical stability of the composite can be increased by increasing the quantity of carbon in the nanocomposite.

2. Tests on a Cell:

A nanocomposite according to the invention, containing 67% of carbon by weight, is synthesised. It is then used in the manufacture of an anode constituted by:
82% of this nanocomposite,
4.5% of PVDF,
13.5% of carbon (Ketjen Black)

A separator and a cathode based on $LiCoO_2$ are superposed on this anode to form the cell.

Figure 6:
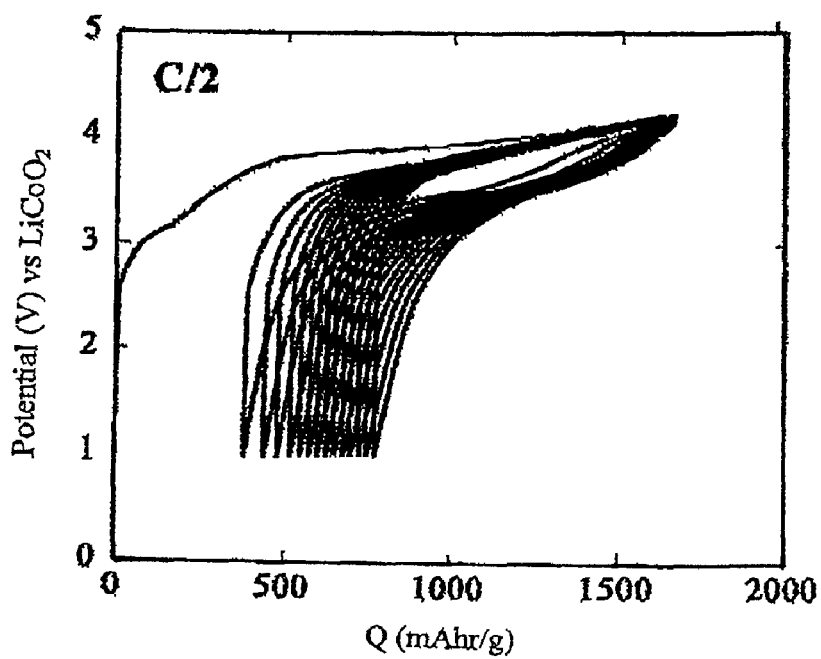
FIG. 6 shows the cycling curves of a cell containing an anodic active material according to the invention and a cathode based on $LiCoO_2$. The discharge was carried out a current of C/2 at 25° C.
Figure 7:
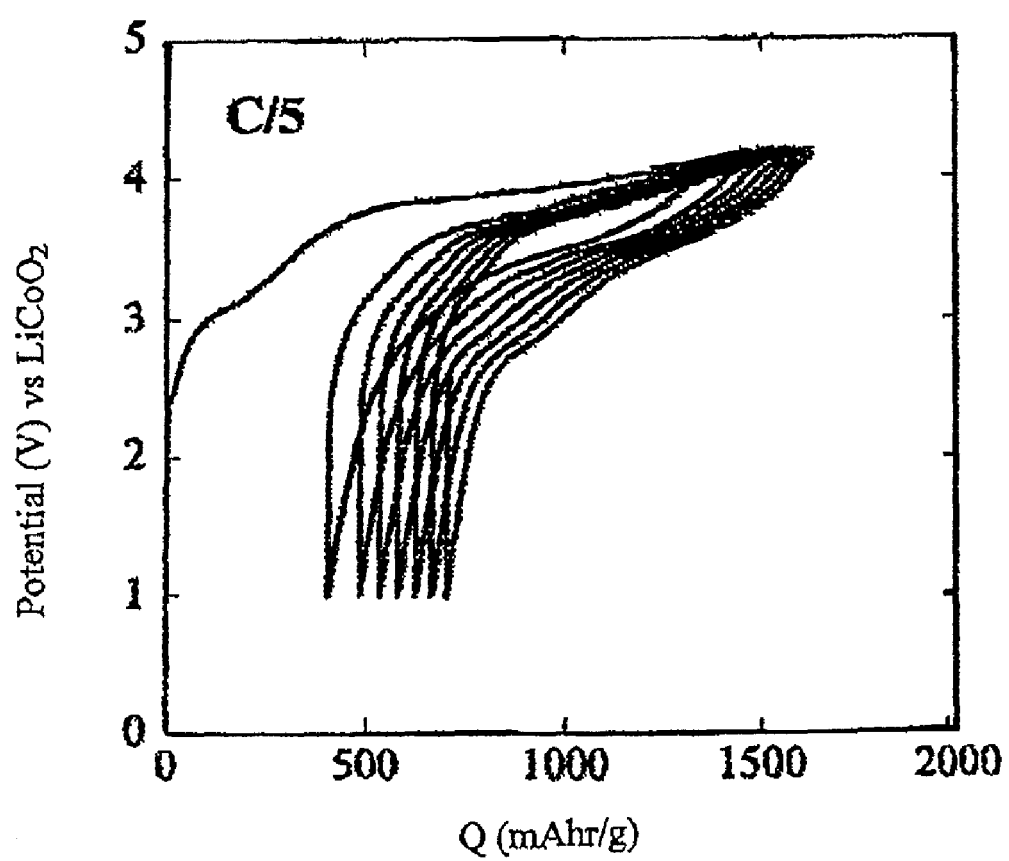
FIG. 7 shows the cycling curves of a cell containing an anodic active material according to the invention and a cathode based on $LiCoO_2$. The discharge was carried out a current of C/5 at 25° C.

The cell is tested in the course of charge-discharge cycles at 25° C. FIGS. 6 and 7 show the results of the cycling trials for a discharge at the currents of C/2 and C/5, respectively. It is found that the capacity discharged is greater than 1000 mAh/g. The cell comprising an anode according to the invention thus displays an increase in capacity compared to lithium ion cells containing an anode material from the prior art.

Table 1 below compares the mass capacities and the mass and volume capacities of the anode material of the cell according to the invention with those of anode materials known from the prior art. For greater simplicity, these comparative calculations were performed considering a simple stack 0.5 mm thick, of one anode, one separator and one cathode. In this way, a direct evaluation is obtained of the energy gain on replacing the carbon anode with an anode containing the Si—C nanocomposite according to the invention. Such a calculation does not take account of the mechanical design of the cell.

The Si—C nanocomposite according to the invention makes it possible to obtain a mass capacity four times greater than that of a carbon anode. It also makes it possible to increase the mass and/or volume energies by 20% and 30% respectively, compared to the use of a standard carbon anode.

The nanocomposite according to the invention also has the advantage of providing a high electrochemical yield of about 90% in the first cycle. The electrochemical yield being defined as the ratio between the quantity of electricity discharged by the cell and the quantity of electricity charged into the cell before that discharge.

TABLE 1

| Anode/cathode Operating voltage of the cathode relative to the $Li^+/Li$ potential | Si—C Capacities (mAh/g) | Calculated mass energy (Wh/kg) | Calculated volume energy (Wh/l) | Mean voltage of the cell |
|---|---|---|---|---|
| C/$LiCoO_2$/4.2 V | — | 201 | 505 | 3.7 V |
| C/$LiMn_{1.5}Ni_{0.5}O_4$/5 V | — | 235 | 573 | 4.5 V |
| Microstructured Si—C/ $LiCoO_2$/4.2 V | 1100/850 | 205 | 580 | 3.4 V |

TABLE 1-continued

| Anode/cathode Operating voltage of the cathode relative to the Li$^+$/Li potential | Si—C Capacities (mAh/g) | Calculated mass energy (Wh/kg) | Calculated volume energy (Wh/l) | Mean voltage of the cell |
|---|---|---|---|---|
| Microstructured Si—C/LiMn$_{1.5}$Ni$_{0.5}$O$_4$/5 V | 1100/850 | 240 | 685 | 4.2 V |
| Nanostructured Si—C/LiCoO$_2$/4.2 V | 1400/1200 | 245 | 645 | 3.4 V |
| Nanostructured Si—C/LiMn$_{1.5}$Ni$_{0.5}$O$_4$/5 V | 1400/1200 | 280 | 760 | 4.2 V |

The present embodiment and the figures must be considered as having been presented by way of illustration and not restrictively, and the invention is not intended to be limited to the details provided here, but can be modified while remaining within the context of the scope of the attached claims.

The invention claimed is:

1. Si—C nanocomposite material for use in a lithium ion cell, obtained by the method comprising the following steps:
    a) providing a silicon powder obtained by subjecting a silicon-based gas to a plasma-enhanced chemical vapour deposition (PECVD) technique operating at a pressure comprised between 1 μbar and 1 mbar, or to a CO$_2$ laser technique to obtain silicon particles, the size of which being less than 100 nm;
    b) mixing the silicon powder with polyvinyl chloride (PVC), and
    c) carrying out the pyrolysis of the mixture at a temperature comprised between 750 and 1000° C. under an inert atmosphere for 1 to 8 hours so that silicon particles are embedded in the carbon derived from the pyrolysis of the polyvinyl chloride and the silicon at the end of step c) is in a polymorphous state.

2. Si—C nanocomposite material according to claim 1 for use in a lithium ion cell, having a mass capacity greater than or equal to 1200 mAh/g, measured at 25° C., for a discharge current less than or equal to C, and exhibiting a 10% loss in capacity after a least one hundred cycles.

3. Si—C nanocomposite material according to claim 1, in which the size of the particles is less than 50 nm.

4. Si—C nanocomposite material according to claim 3, in which the size of the particles is less than 30 nm.

5. Si—C nanocomposite material according to claim 4, in which the size of the particles is less than 5 nm.

6. Si—C nanocomposite material according to claim 1, obtained from silicon whose specific surface area, in step a), is from 5 to 180 m$^2$/g.

7. Si—C nanocomposite material according to claim 6, whose specific surface area, in step a), is from 5 to 80 m$^2$/g.

8. Si—C nanocomposite material according to claim 1, in which a mass percentage of carbon in the nanocomposite is from 45 to 75%.

9. Si—C nanocomposite material according to claim 8, in which a mass percentage of carbon in the nanocomposite is from 50 to 70%.

10. Si—C nanocomposite material according to claim 9, in which the mass percentage of carbon in the nanocomposite is from 50 to 65%.

11. Si—C nanocomposite material according to claim 1, having an atomic composition of Si$_{1.6}$—C$_6$.

12. Lithium cell comprising at least one anode containing a nanocomposite material according to claim 1.

13. A method for manufacturing the Si-C nanocomposite material of claim 1, comprising the following steps:
    a) providing a silicon powder obtained by subjecting a silicon-based gas to a plasma-enhanced chemical vapour deposition (PECVD) technique operating at a pressure comprised between 1 μbar and 1 mbar, or to a CO$_2$ laser technique to obtain silicon particles, the size of which being less than 100 nm;
    b) mixing the silicon powder with polyvinyl chloride (PVC), and
    c) carrying out the pyrolysis of the mixture at a temperature comprised between 750 and 1000° C. under an inert atmosphere for 1 to 8 hours so that silicon particles are embedded in the carbon derived from the pyrolysis of the polyvinyl chloride and the silicon at the end of step c) is in a polymorphous state.

* * * * *